(12) United States Patent
Vuletic

(10) Patent No.: US 8,124,005 B2
(45) Date of Patent: Feb. 28, 2012

(54) PROCESS AND APPARATUS FOR PRODUCING SPONGE IRON

(75) Inventor: Bogdan Vuletic, Düsseldorf (DE)

(73) Assignee: Siemens VAI Metals Technologies GmbH (AT)

( * ) Notice: Subject to any disclaimer, the term of this patent is extended or adjusted under 35 U.S.C. 154(b) by 42 days.

(21) Appl. No.: 12/666,893

(22) PCT Filed: Jun. 10, 2008

(86) PCT No.: PCT/EP2008/004623
§ 371 (c)(1),
(2), (4) Date: Mar. 11, 2010

(87) PCT Pub. No.: WO2009/000409
PCT Pub. Date: Dec. 31, 2008

(65) Prior Publication Data
US 2010/0192729 A1    Aug. 5, 2010

(30) Foreign Application Priority Data

Jun. 28, 2007 (AT) ................. A 1003/2007

(51) Int. Cl.
*C21C 7/072* (2006.01)
*C21B 13/02* (2006.01)
(52) U.S. Cl. ......... 266/197; 266/218; 266/219; 266/265
(58) Field of Classification Search ................... 266/197, 266/218, 219, 265
See application file for complete search history.

(56) References Cited

U.S. PATENT DOCUMENTS

| | | | |
|---|---|---|---|
| 2,189,260 A | 2/1940 | Acheson | |
| 2,862,808 A | 12/1958 | De Jahn | |
| 3,601,381 A | 8/1971 | Beggs | |
| 3,704,011 A | 11/1972 | Hand et al. | |
| 3,748,120 A | 7/1973 | Beggs et al. | |
| 3,749,386 A | 7/1973 | Beggs et al. | |
| 3,764,123 A | 10/1973 | Beggs et al. | |
| 3,770,421 A | 11/1973 | Celada et al. | |
| 3,816,101 A | 6/1974 | Beggs et al. | |
| 3,848,034 A * | 11/1974 | Schaefer | 264/30 |
| 4,032,123 A | 6/1977 | Brown et al. | |
| 4,046,557 A | 9/1977 | Beggs | |

(Continued)

FOREIGN PATENT DOCUMENTS

AT    387037 B    11/1988

(Continued)

OTHER PUBLICATIONS

International Search Report dated Sep. 2, 2008, issued in corresponding international application No. PCT/EP2008/004623.

*Primary Examiner* — George Wyszomierski
*Assistant Examiner* — Tima M McGuthry Banks
(74) *Attorney, Agent, or Firm* — Ostrolenk Faber LLP

(57) ABSTRACT

A process and an apparatus for producing sponge iron from iron-oxide-containing material in lump form by direct reduction in a reduction shaft using a reducing gas, wherein the entire reducing gas is introduced by means of a number of reducing gas distribution ducts in a star-like arrangement or arranged parallel to one another, preferably into the lower quarter of the reduction shaft, and evenly distributed over the entire cross-section of the reduction shaft.

7 Claims, 2 Drawing Sheets

U.S. PATENT DOCUMENTS

| | | | |
|---|---|---|---|
| 4,118,017 A * | 10/1978 | Hendrickson | 266/187 |
| 4,173,465 A | 11/1979 | Meissner | |
| 4,188,022 A | 2/1980 | Beggs et al. | |
| 4,201,571 A | 5/1980 | Beggs et al. | |
| 4,234,169 A | 11/1980 | Scarlett et al. | |
| 4,248,623 A | 2/1981 | Papst et al. | |
| 4,253,867 A | 3/1981 | Martinez-Vera | |
| 4,270,739 A | 6/1981 | Ahrendt et al. | |
| 4,374,585 A | 2/1983 | Papst et al. | |
| 4,413,812 A | 11/1983 | Pirklbauer et al. | |
| 4,528,030 A | 7/1985 | Becerra-Nova | |
| 4,556,417 A | 12/1985 | Bustani-Adem et al. | |
| 4,605,205 A | 8/1986 | Langner et al. | |
| 4,720,299 A | 1/1988 | Milionis | |
| 4,725,309 A | 2/1988 | Flores-Verdugo et al. | |
| 4,826,429 A | 5/1989 | Niems et al. | |
| 4,900,356 A | 2/1990 | Hoffman | |
| 5,064,467 A | 11/1991 | Bueno et al. | |
| 5,078,788 A | 1/1992 | Bueno et al. | |
| 5,387,274 A | 2/1995 | Bueno et al. | |
| 5,407,460 A | 4/1995 | Bueno et al. | |
| 6,183,534 B1 | 2/2001 | Kepplinger et al. | 75/436 |
| 6,213,762 B1 | 4/2001 | Eichberger et al. | |
| 6,379,423 B1 * | 4/2002 | Vuletic | 75/492 |
| 6,511,629 B1 | 1/2003 | Kepplinger et al. | |

FOREIGN PATENT DOCUMENTS

| | | |
|---|---|---|
| DE | 147531 C | 10/1901 |
| DE | 26 59 670 A1 | 7/1977 |
| DE | 2628447 A1 | 1/1978 |
| DE | 2810657 B | 5/1979 |
| DE | 3422185 A1 | 12/1985 |
| DE | 196 25 127 A1 | 12/1997 |
| EP | 0904415 | 7/1977 |
| EP | 85290 A | 8/1983 |
| EP | 0166679 A1 | 1/1986 |
| GB | 1522929 A | 8/1978 |
| JP | 5302107 A | 11/1993 |
| KZ | (13) A (11) 8952 | 5/2000 |
| KZ | (13) B (11) 8147 | 12/2000 |
| WO | WO 96/12045 | 4/1996 |
| WO | WO 98/21537 A | 5/1998 |
| WO | WO 99/04045 A | 1/1999 |
| WO | WO 00/9765 | 2/2000 |
| WO | WO 00/36157 A | 6/2000 |
| WO | WO 00/36159 A | 6/2000 |

* cited by examiner

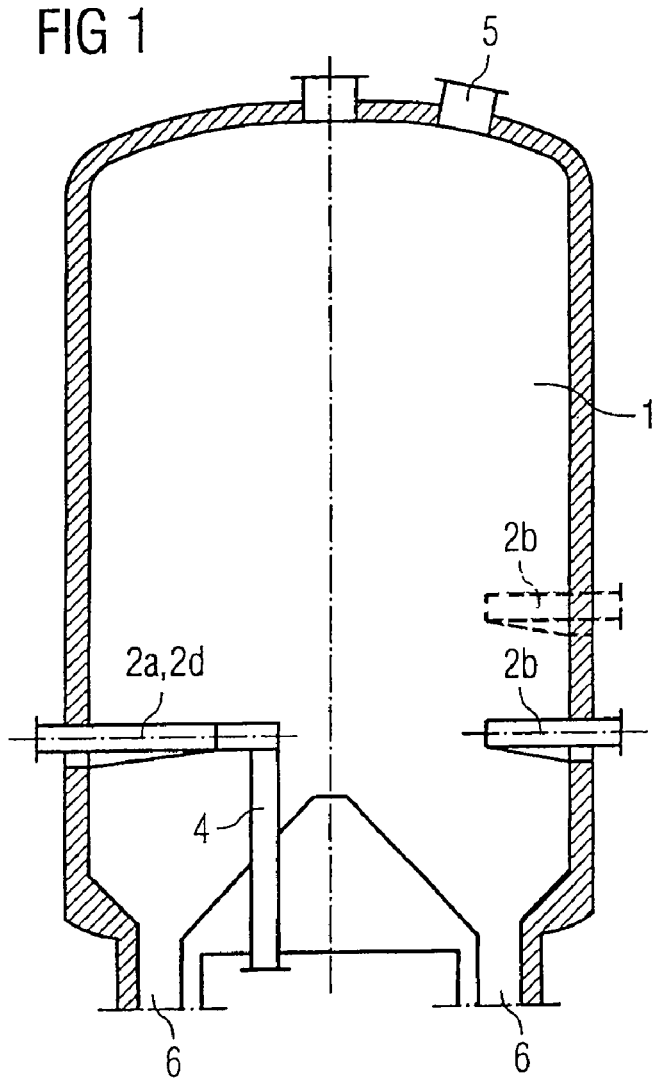
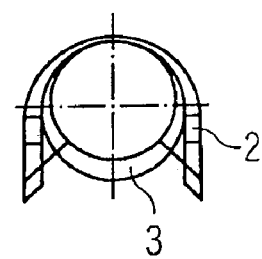

PROCESS AND APPARATUS FOR PRODUCING SPONGE IRON

CROSS REFERENCE TO RELATED APPLICATION

The present application is a 35 U.S.C. §§371 national phase conversion of PCT/EP2008/004623, filed Jun. 10, 2008, which claims priority of Austrian Application No. A 1003/2007, filed Jun. 28, 2007, incorporated by reference herein. The PCT International Application was published in the German language.

BACKGROUND OF THE INVENTION

The invention relates to a process and an apparatus for producing sponge iron from iron-oxide-containing material in lump form by direct reduction in a reduction shaft using a reducing gas.

When producing sponge iron, also referred to as direct reduction iron, by direct reduction, the reduction shaft is charged from above with iron oxides in lump form, such as pellets and/or lump ores, through which a rising reducing gas is made to flow on the basis of the counterflow principle. The reducing gas that is introduced into the reduction shaft, preferably being at a temperature of 750 to 900° C., containing dust and rich in carbon monoxide and hydrogen, in particular containing 70 to 90% CO and $H_2$, is preferably produced in a fusion gasifier or in some other gas generator. In this way, the iron oxide in lump form is reduced completely or partially to sponge iron and a degree of metallization of from 80% to over 95% of the sponge iron can be achieved.

In the apparatuses and processes that are known from the prior art, the reducing gas is introduced at the circumference of the reduction shaft, for example by means of an annular duct that is formed by refractory bricks, known as a bustle duct. When the reducing gas is introduced by means of such a bustle duct, however, less reducing gas reaches the middle of the reduction shaft, and so the degree of metallization in the outer region is higher than it is toward the middle of the reduction shaft. Since a poured fill with a lower degree of metallization has a greater bulk weight than such a fill with a higher degree of metallization, and also breaks down to a greater extent, the motion of the filling process is concentrated toward the middle of the reduction shaft. This centrally concentrated motion has the effect that the uneven distribution of the specific amount of reducing gas is further exacerbated. The uneven distribution of the reducing gas is all the greater the larger the diameter of the reduction shaft and the greater the amount of dust contained in the reducing gas. Furthermore, the bustle duct formed by refractory bricks requires a lining, which is costly, susceptible to wear and therefore keeps having to be renewed.

In DE2628447A1, in addition to the bustle duct, a central feeding device below the level of the bustle duct is described. According to EP0904415A1, additional reducing gas inlets in the form of downwardly open ducts or obliquely downwardly directed lines with an open inner end are likewise located below the level of a bustle duct.

Although these apparatuses provide a better supply of reducing gas toward the middle, the reduction shaft with the bustle duct and gas distribution ducts in the middle is costly and still has the disadvantage that the reducing gas is introduced at the same pressure at two different levels, as a specific result of which more reducing gas per $m^2$ is introduced through the higher inlet, since the upward path of the gas is shorter there. Less reducing gas specifically means, however, a lower degree of metallization of the fill in the middle of the reduction shaft.

DE 28 10 657 discloses a reduction shaft which has in addition to a bustle pipe devices for the introduction of process gases, such as for example natural gas. Disadvantages in this case are the uneven introduction of the reducing gas via the bustle pipe and the high cost of the apparatus.

WO 00/36159 describes a reduction shaft in which reducing gas is introduced at two levels or in two zones. Disadvantages are, in particular, the great technical cost of the plant and the high requirements for controlling the introduction of the reducing gas.

SUMMARY OF THE INVENTION

The object of the present invention is therefore to provide a simple process and a simple apparatus with which uniform distribution of the reducing gas, and consequently uniform metallization, are obtained without the need for a bustle duct and the associated costly and wear-susceptible lining of the reduction shaft.

The subject matter of the invention is accordingly a process for producing sponge iron from iron-oxide-containing material in lump form by direct reduction in a reduction shaft using a reducing gas, which process is characterized in that the entire reducing gas is introduced by means of a number of reducing gas distribution ducts in a star-like arrangement or arranged parallel to one another, preferably into the lower quarter of the reduction shaft.

To carry out the process, iron-oxide-containing material in lump form, such as pellets and/or lump ore, is introduced into a reducing shaft from above. In addition, gas, known as reducing gas, preferably at a temperature of 750 to 900° C., produced in particular in a fusion gasifier, containing dust and rich in carbon monoxide and hydrogen, in particular containing 70 to 90% CO and $H_2$, is introduced via reducing gas distribution ducts, preferably in the lower quarter of the reduction shaft. The reducing gas introduced rises upward and thereby reduces the iron oxide to form sponge iron. The exclusive introduction of the entire reducing gas via the reducing gas distribution ducts in a star-like arrangement or arranged parallel to one another brings about a uniform distribution of the reducing gas and the dust contained in it over the entire cross section of the reduction shaft.

The reducing gas distribution ducts are downwardly open half-pipe shells that are fastened on skid pipes and have downwardly extended parallel walls. When the reduction shaft is charged from above with the iron oxide fill, a space that is free from fill is created under the half-pipe shells and from there the reducing gas passes uniformly into the fill.

The reducing gas distribution ducts may be in a star-like arrangement and be of the same length or of different lengths. With preference, they are of different lengths, the shorter reducing gas distribution ducts preferably being overhung-mounted and the longer reducing gas distribution ducts preferably being supported by water-cooled supporting pipes. A star-like arrangement means that a number of reducing gas distribution ducts, preferably 4 to 12, in particular 8, extend from the wall of the reduction shaft into the interior of the reduction shaft, all the reducing gas distribution ducts being directed toward the center point of the reduction shaft. With preference, a longer reducing gas distribution duct is then respectively arranged alongside a shorter duct, the longer reducing gas distribution ducts preferably being fitted over the discharge hoppers for the sponge iron. Arranged at the lower end of the discharge hoppers are preferably water-cooled discharge worms or other discharge devices.

The reducing gas distribution channels are preferably on one level.

In the case of an arrangement in which a longer reducing gas distribution duct is respectively arranged alongside a shorter duct, it is however also possible with preference to fit the shorter, overhung-mounted reducing gas distribution ducts just above the longer, supported reducing gas distribution ducts. This may possibly be of advantage when using ores that have a tendency to break up and for bridges to form. It is important here that the reducing gas distribution ducts at different heights lie so closely one above the other that there is virtually no difference in pressure when the reducing gas is introduced.

The reducing gas distribution ducts may also be arranged in parallel and be of the same length or of different lengths. With preference, the reducing gas distribution ducts are in this case on one level. In the case of small diameters of the reduction shaft, the entire reducing gas is preferably introduced via a number of reducing gas distribution ducts, preferably 2 to 8, in particular 4, arranged in parallel, extending continuously from the wall of the reduction shaft to the opposite wall of the reduction shaft. In the case of reduction shafts of average size, there may additionally be two reducing gas distribution ducts lying opposite each other, directed toward the middle along the diameter of the shaft and parallel to the other reducing gas distribution ducts extending continuously from the wall of the reduction shaft to the opposite wall of the reduction shaft. These additional, shorter reducing gas distribution ducts are with preference supported by water-cooled supporting pipes.

Further subject matter of the invention is an apparatus for producing sponge iron from iron-oxide-containing material in lump form by direct reduction in a reduction shaft (1) using a reducing gas, which apparatus is characterized in that the entire reducing gas is fed in via a number of reducing gas distribution ducts (2a, 2b) in a star-like arrangement, preferably in the lower quarter of the reduction shaft (1), or reducing gas distribution ducts (2) arranged parallel to one another, preferably in the lower quarter of the reduction shaft (1).

The invention is explained in more detail below on the basis of exemplary embodiments that are represented in the figures, in which:

BRIEF DESCRIPTION OF THE DRAWINGS

FIG. 1 shows a vertical section through a reduction shaft (1) in which a reducing gas distribution duct (2a, 2d) and a reducing gas distribution duct (2b) are depicted, FIG. 2 shows a vertical section through a reducing gas distribution duct (2) with a skid pipe (3) for the introduction of the reducing gas into the fill.

DESCRIPTION OF A PREFERRED EMBODIMENT

A cylindrical reduction shaft (1), which is charged from above with iron-oxide-containing material in lump form via distribution pipes (5), is provided in the lower quarter of the shaft with a plurality of reducing gas distribution ducts (2), through which a reducing gas is introduced into the reduction shaft (1). At the lower end of the reduction shaft (1), the material that has been reduced to sponge iron is discharged through discharge hoppers (6). Arranged at the lower end of the discharge hoppers (6) are water-cooled discharge worms or other discharge devices, which are not represented in the Figures.

Figure 4:
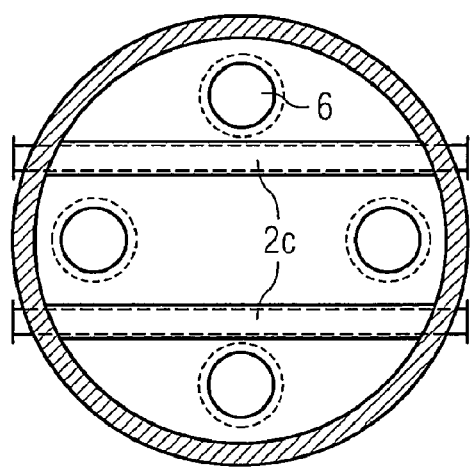
FIG. 4 shows a horizontal section through a second embodiment of a reduction shaft (1) as shown in FIG. 1 above the reducing gas distribution ducts (2c) arranged in parallel and FIG. 5 shows a horizontal section through a third embodiment of a reduction shaft (1) as shown in FIG. 1 above the reducing gas distribution ducts (2c) and (2d) arranged in parallel.

Reducing gas distribution ducts (2) are downwardly open half-pipe shells with downwardly extended parallel walls, which, as can be seen in FIG. 4, are fastened on skid pipes (3), which are cooled inside, preferably by water.

Figure 3:
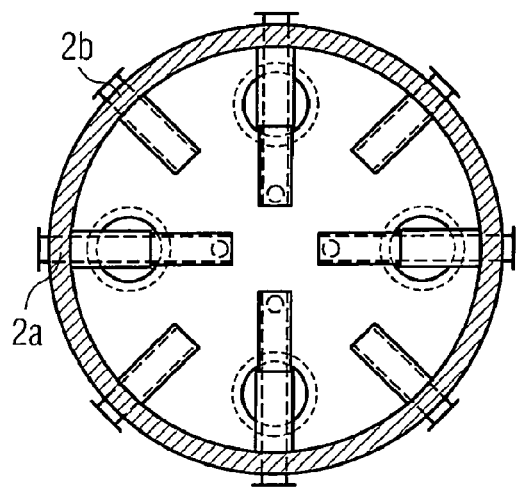
FIG. 3 shows a horizontal section through the reduction shaft (1) as shown in FIG. 1 above the reducing gas distribution ducts (2a) and (2b) in a star-like arrangement.

The reducing gas distribution ducts (2) may be in a star-like arrangement, e.g., an arrangement as in FIG. 3.

The reducing gas distribution ducts (2a, 2b) in a star-like arrangement may be of the same length or may be of different lengths as shown in FIG. 3. With preference, they are of different lengths. With particular preference, longer reducing gas distribution ducts (2a) alternate with shorter reducing gas distribution ducts (2b), as represented in FIG. 3. Then, the middle region and part of the outer region, in particular about 50%, of the reduction shaft (1) is supplied with the reducing gas via the longer reducing gas distribution ducts (2a) and the remaining part of the outer region is supplied with the reducing gas via the shorter reducing gas distribution ducts (2b). Longer skid pipes (3), as are required for longer reducing gas distribution ducts (2a), are usually additionally supported by water-cooled supporting pipes (4), as shown in FIG. 1, which are fastened to the bottom of the reduction shaft (1), while the skid pipes (3) of the shorter reducing gas distribution ducts (2b) are preferably overhung-mounted.

In the case of reduction shafts (1) with a star-like arrangement of the reducing gas distribution ducts (2a, 2b) and having a relatively lower number of discharge hoppers (6), preferably fewer than 8, in particular 4, the longer reducing gas distribution ducts (2a) are arranged with preference over the discharge hoppers (6) and the shorter ducts (2b) are arranged with preference over the spaces between the discharge hoppers (6).

The reducing gas distribution ducts (2a, 2b) are preferably arranged on one level along the shaft as in FIG. 1.

In the case of an arrangement in which a longer reducing gas distribution duct (2a) is respectively arranged alongside a shorter duct (2b), it is however also possible with preference to arrange the shorter, overhung-mounted reducing gas distribution ducts (2b), as shown in a phantom depiction in FIG. 1, just above the longer, supported reducing gas distribution ducts (2a). This may possibly be of advantage when using ores that have a tendency to break up and for bridges to form. It is important here that the reducing gas distribution ducts (2a, 2b) at different heights lie so closely one above the other that there is virtually no difference in pressure when the reducing gas is introduced.

Figure 5:
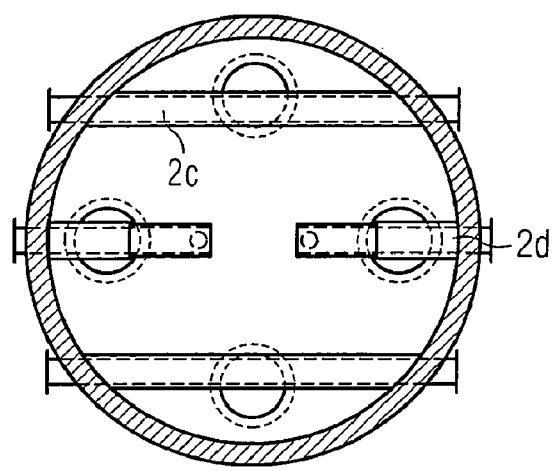

The reducing gas distribution ducts (2) may also be arranged parallel to one another as in FIGS. 4 or 5.

The reducing gas distribution ducts (2c, 2d) arranged parallel to one another may be of the same length or of different lengths and lie with preference on one level. If the reducing gas distribution ducts (2) are arranged in parallel, it is sufficient, in particular in the case of small reduction shafts, for there to be two or more reducing gas distribution ducts (2c) arranged parallel to one another, made to extend continuously from the wall of the reduction shaft to the opposite wall of the reduction shaft as in FIG. 5.

In the case of reduction shafts of average size, for instance in the case of reduction shafts of 6 to 8 m in diameter, it is advantageous to arrange two further reducing gas distribution ducts (2*d*) along the diameter of the reduction shaft (1) and lying opposite, and to arrange the remaining reducing gas distribution ducts (2*c*) parallel thereto and preferably extending continuously from the wall of the reduction shaft to the opposite wall of the reduction shaft, as shown in FIG. 5. The reducing gas distribution ducts (2*d*) are in this case preferably supported by water-cooled supporting pipes (4), in a way analogous to the support of the reducing gas distribution ducts (2*a*) in a star-like arrangement.

The invention claimed is:

1. An apparatus for producing sponge iron from iron-oxide-containing material in lump form, the apparatus comprising:
    a reduction shaft configured to contain a process for forming the sponge iron, the reduction shaft having a longitudinal axis;
    reducing gas distribution ducts extending from a wall of the shaft into the interior of the shaft for feeding an entire supply of reducing gas into the reduction shaft, the ducts extending in a direction transverse to the longitudinal axis of the shaft and arranged and oriented so that each duct is directed toward a center point of the shaft or arranged and oriented parallel to one another,
    wherein the reducing gas distribution ducts are arranged at one level with respect to the longitudinal axis of the reduction shaft so as to attain an even distribution of the reducing gas over an entire cross-section of the reduction shaft.

2. The apparatus of claim 1, wherein the reduction shaft includes a lower quarter, and the ducts are positioned at a level along the shaft so as to enter and extend into the lower quarter of the reduction shaft.

3. The apparatus as claimed in claim 2, wherein the reducing gas distribution ducts include a longer length reducing gas distribution duct alongside a shorter length reducing gas distribution duct.

4. The apparatus as claimed in claim 1, wherein each reducing gas distribution duct comprises a downwardly open half-pipe shell.

5. The apparatus as claimed in claim 4, wherein at least some of the distribution ducts include skid pipes at the downwardly open half-pipe shells.

6. The apparatus as claimed in claim 1, wherein the reduction shaft includes a lower quarter and the ducts are positioned at the level along the shaft so as to enter and extend into the lower quarter of the reduction shaft.

7. The apparatus as claimed in claim 1, wherein the distribution ducts include first ducts and second ducts, the first ducts having a first length shorter than a second length of the second ducts,
    wherein each duct of the first ducts is positioned between ducts of the second ducts so as to provide an alternating arrangement.

* * * * *